Patented Apr. 20, 1948

2,440,218

UNITED STATES PATENT OFFICE 2,440,218

MANUFACTURE OF KETOTETRAHYDROPYRIDINE DERIVATIVES AND HYDROXYPYRIDINE DERIVATIVES

Franz Bergel and Aaron Cohen, Welwyn Garden City, England, assignors, by mesne assignments, to Hoffmann-La Roche Inc., Nutley, N. J., a corporation of New Jersey No Drawing. Application April 8, 1943, Serial No. 482,324. In Great Britain March 9, 1942

Section 1, Public Law 690, August 8, 1946
Patent expires March 9, 1962

16 Claims. (Cl. 260—295.5)

This invention relates to the synthesis of N-substituted pyridinium salts containing a 3-hydroxyl group, and of 3-hydroxypyridine derivatives related to vitamin $B_6$ and intermediates therefor.

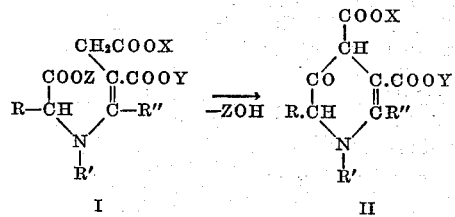

According to this invention, compounds of the general Formula I are cyclised to yield ketotetrahydropyridine derivatives of the general Formula II. In Formula I, R may be an alkyl group or such other group as may be attached to the α-carbon atom of an α-amino-acid without interfering with the reactions taking place in the process according to the present invention; R' is an alkyl or aralkyl group; R'' is hydrogen, and X, Y and Z, which are not necessarily identical, are lower alkyl groups such as methyl or ethyl. Compounds of Formula I are obtained, for example, by the reaction between an ester of an α-aminoacid and a monoacylsuccinic ester according to the process described in specification S. N. 455,383, filed August 19, 1942, now Patent No. 2,384,068. Thus, a starting material made from the ethyl ester of N-methylalanine and diethyl α-formyl-succinate according to the aforesaid specification would have Formula I where $R=R'=CH_3$; $R''=H$, and $X=Y=Z=C_2H_5$.

The above-mentioned cyclisation is carried out according to the present invention by submitting compounds of Formula I to the action of an alkali metal such as sodium, or alcoholates thereof, preferably in an inert solvent such as benzene or toluene and under an inert atmosphere such as nitrogen. The reaction proceeds with the elimination of the elements of the alcohol represented by Z.OH, and with the formation of the alkali metal derivative of the ketotetrahydropyridine derivative, which has the Formula II, in which R, R', R'', X and Y bear the same interpretation as given above. The alkali metal derivative is suitably treated with acid to liberate the compound II, and the latter is converted into a hydrohalide salt by treatment with anhydrous hydrogen halide. These salts are expressed by the Formula III, showing the enolic form, and constituting a substituted 3-hydroxydihydropyridine hydro chloride, corresponding to a substituted 3-ketotetrahydropyridine hydrochloride.

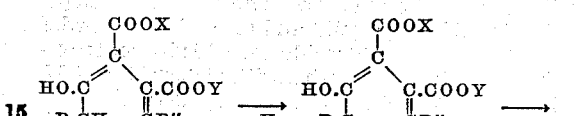

Salts such as the hydrochloride shown in Formula III are submitted to a dehydrogenation, which has been discovered to occur, for instance, by exposing the salt in absolute alcohol and ether to an oxygen-containing gas such as air or to oxygen. With the loss of two hydrogen atoms, a 3-hydroxypyridinium chloride is formed, having the Formula IV.

In the case where the quaternary pyridinium salt IV has R'=benzyl, it is possible to effect its conversion into a pyridine derivative by treating the salt with hydrogen in the presence of a hydrogenation catalyst such as palladised charcoal, whereby the benzyl group is eliminated and replaced by hydrogen with the formation of the hydro-chloride of a 3-hydroxypyridine derivative illustrated by the Formula V. Thus, for example, by suitable choice of starting material within the scope of the definitions given for Formula I, it has been discovered that 2-methyl-3- hydroxy-4:5-dicarbmethoxypyridine and the corresponding free acid 2-methyl-3-hydroxy-4:5-dicarboxypyridine can be synthesised. If the pyridinium salts of Formula IV are treated with one equivalent of cold alkali, the corresponding phenol betaine is formed via the quaternary base, and if excess of alkali is used and the solution is heated, hydrolysis of the ester groups COOX and COOY occurs and a betaine of the corresponding hydroxy-dicarboxylic acid is formed.

The pyridinium salts and the pyridine derivatives described are useful intermediates in the synthesis of vitamin $B_6$.

The following examples illustrate how the process of the invention may be carried into effect:

1. A solution of 30 parts by weight of the condensation product obtained from the ethyl ester of N-methyl alanine and diethyl α-formyl-succinate (as described in Example 7 of specification S. N. 455,383, filed August 19, 1942) in 120 parts by volume of dry benzene is added to a benzene suspension of 2.1 parts by weight of powdered sodium in an atmosphere of dry nitrogen, and the mixture is gently heated under reflux. The sodium dissolves, and heating is then continued for 1 hour. The solution is cooled and shaken with a mixture of ice and the calculated amount of acetic acid containing a small amount of sulphuric acid which is equivalent to the sodium used. The benzene extract is washed with water, sodium bicarbonate solution, water again, dried, and freed from solvent. The residual oil is dissolved in concentrated anhydrous alcoholic hydrogen chloride and treated with excess of dry ether. The product precipitated is rubbed till solid and ground to a powder consisting of the hydrochloride of 1:2-di-methyl-3-hydroxy-4:5-dicarbethoxydihydropyridine (III, where $R=R'=CH_3$, $R''=H$, $X=Y=C_2H_5$).

This hydrochloride is dehydrogenated by dissolving in the minimum amount of warm absolute alcohol and adding an equal volume of ether, and exposing the solution to air or oxygen. After about 1 day, more ether, or ethyl acetate, is gradually added to precipitate the product. By repetition of the process, the product, 1:2-dimethyl-3-hydroxy-4:5-dicarbethoxypyridinium chloride (IV, where $R=R'=CH_3$, $R''=H$, and $$X=Y=C_2H_5)$$

crystallises out in colourless needles, having a melting point of 165° C. with decomposition.

The quaternary base corresponding to this pyridinium salt gives rise to a phenolic betaine, and, by hydrolysis of the ester groups, to a betaine of the hydroxydicarboxylic acid as follows: A solution of 6.1 parts by weight of 1:2-dimethyl-3-hydroxy-4:5-dicarbethoxy-pyridinium chloride in 20 parts by volume of water is treated at 0° C. with one molecular equivalent of 2 normal sodium hydroxide solution. A mass of fine needles soon crystallises out. This is filtered off and recrystallised from a concentrated aqueous solution. So obtained, it melts between 85° and 100° C., but when dried in vacuo it loses water and yields 3.8 parts by weight of a pale yellow substance which, when anhydrous, crystallises from ethyl acetate in pale yellow prisms having a melting point of 162–165° C. This compound is the phenolic betaine of 1:2-dimethyl-3-hydroxy-4:5-dicarbethoxypyridinium hydroxide.

A solution of 6.1 parts by weight of 1:2-dimethyl-3-hydroxy-4:5-dicarbethoxypyridinium chloride in 20 parts of water is gently warmed with a concentrated aqueous solution of 2.4 parts by weight of sodium hydroxide for 30 minutes. The solution is made just acid to litmus by adding acetic acid. The product which separates crystallises from water in colourless leaflets having a melting point of 230° C. with decomposition. It is a betaine of 1:2-dimethyl-3-hydroxy-4:5-dicarboxypyridinium hydroxide.

2. dl-Alanine methyl ester is mixed with slightly more than the molecular equivalent of benzaldehyde. The Schiff base formed is dried in ethereal solution, the ether removed, and the residue dissolved in approximately four parts by volume of methyl alcohol and hydrogenated over palladised charcoal. After removal of the catalyst and solvent, the residue is distilled, yielding the methyl ester of N-benzyl-alanine (methyl α-benzyl-aminopropionate) as a colourless liquid having a boiling point of 131–133° C./10 mm. 19.3 parts by weight of this compound are mixed with 17.5 parts by weight of dimethyl α-formylsuccinate in accordance with the method described in specification S. N. 455,383, filed August 19, 1942. After heating the mixture for 1 hour on the water-bath, it is cooled and dissolved in dry ether or benzene. A small amount of diketopiperazine derivative, corresponding to the amino ester, separates and is collected. The solution is washed with cold sodium bicarbonate solution, dried, freed from solvent, and the residue distilled, yielding the condensation product (I; where $R=CH_3$, $R'=CH_2Ph$, $R''=H$, $X=Y=Z=CH_3$) as a viscous yellow oil having a boiling point of about 200° C./0.3 mm.

A solution of 36 parts by weight of this compound in 120 parts by volume of dry benzene, in which are suspended 2.4 parts by weight of powdered sodium, is boiled under reflux in an atmosphere of nitrogen. Dissolution of the sodium is facilitated by the addition of a small amount of sodium methoxide or sodium ethoxide. Heating is then continued for 1 hour and the solution is then cooled and acidified as described in Example 1. The washed and dried benzene extract is freed from solvent and treated with sufficient anhydrous alcoholic hydrogen chloride to form the hydrochloride of the cyclisation product. This is precipitated as a slowly solidifying oily product by the addition of excess of anhydrous ether. However, by adding insufficient ether for the precipitation to occur and by exposing the alcoholic-ethereal solution to air or oxygen for at least one day, the dehydrogenation product separates gradually as fine colourless needles having a melting point of 146–148° C. This compound is 1-benzyl-2-methyl-3-hydroxy-4:5-dicarbmethoxy-pyridinium chloride (IV, where $R=CH_3$, $R'=CH_2Ph$, $R''=H$, $X=Y=CH_3$). This quaternary salt yields the corresponding phenolic betaine as follows: A cold concentrated aqueous solution of 7 parts by weight of 1-benzyl-2-methyl-3-hydroxy-4:5-dicarbmethoxypyridinium chloride is treated with one molecular equivalent of cold 2N sodium hydroxide. The product soon crystallises out and is filtered off and washed with a little water and dried in vacuo, being obtained in a yield of slightly more than 6 parts by weight. It crystallises from water in flat needles which contain some water of crystallisation and melt partly about 100° C. The anhydrous material becomes yellow on heating and melts to reddish liquid at 138–140° C. It is the phenolic betaine of 1-benzyl-2-methyl-3-hydroxy-4:5-dicarbmethoxypyridinium hydroxide.

A solution of 6.5 parts by weight of 1-benzyl-2-methyl-3-hydroxy-4:5-dicarbmethoxy-pyridinium chloride in 20 parts by volume of methyl alcohol is shaken with hydrogen in the presence of 0.5 part by weight of palladised charcoal (1:4). The calculated amount of hydrogen is taken up in a few minutes and after filtering from the catalyst and evaporating off the methyl alcohol under reduced pressure, the product (4.2 parts by weight) is crystallised from alcohol-ether in colourless needles having a melting point of 165° C., followed by decomposition. It is obvious that the same product is obtained by carrying out the hydrogenation on the above phenolic betaine in a methyl alcoholic solution containing one molecular equivalent of hydrogen chloride.

This product is 2-methyl-3-hydroxy-4:5-dicarbmethoxypyridine hydrochloride (V, where R=X=Y=CH₃ and R″=H). It gives a blue colour with the Gibbs phenol reagent.

It is hydrolysed by heating on the water-bath with 3 molecular equivalents of 6 normal sodium hydroxide. The solution is made slightly acid to litmus with 5 to 6 normal hydrochloric acid, and the product 2-methyl-3-hydroxy-4:5-dicarboxypyridine, crystallises out having a melting point of 259° C. with decomposition, agreeing in properties with the same substance synthesised by another method of Ichida and Emoto (Sci. Papers, Inst. Phys. Chem. Res., Tokyo, 1941, 38, 347). On further crystallisation the melting point is raised to 265° C.

3. The preparation in accordance with Example 2 is repeated but with the substitution of 5.6 parts of sodium methoxide in place of 2.4 parts of powdered sodium. The reactions and quantities are otherwise identical with those of Example 2 and the same product is obtained.

The conversion of compounds III to compounds IV is claimed in our copending divisional application Serial No. 550,856. The conversion of compounds IV to compounds V is claimed in our copending divisional application Serial No. 550,855.

We claim:

1. A process for the manufacture of ketotetrahydropyridine derivatives of the general formula

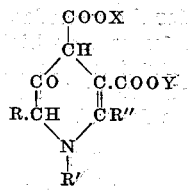

which comprises subjecting compounds of the general formula

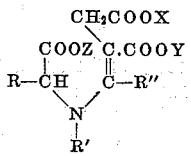

to the action of a substance selected from the group consisting of alkali metals and alkali metal alcoholates, and treating the product thus formed with an acid to liberate a ketotetrahydropyridine derivative of the aforesaid general formula, in both formulae R being alkyl R' being a member selected from the group consisting of alkyl and aralkyl radicals, R″ being hydrogen and X, Y and Z being lower alkyl radicals, not necessarily identical.

2. A process for the manufacture of ketotetrahydropyridine derivatives of the general formula

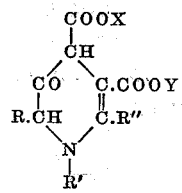

which comprises subjecting compounds of the general formula

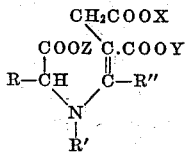

to the action of a substance selected from the group consisting of alkali metals and alkali metal alcoholates in the presence of an inert solvent and under an inert atmosphere, and treating the product thus formed with an acid to liberate a ketotetrahydropyridine derivative of the aforesaid general formula, in both formulae R being alkyl R' being a member selected from the group consisting of alkyl and aralkyl radicals, R″ being hydrogen and X, Y and Z being lower alkyl radicals, not necessarily identical.

3. A process for the manufacture of a ketotetrahydropyridine derivative which comprises subjecting the condensation product of the ethyl ester of N-methylalanine and diethyl-α-formyl succinate having the formula $$\begin{array}{c} CH_2COOC_2H_5 \\ COOC_2H_5 \diagdown C.COOC_2H_5 \\ CH_3-CH \quad \| \\ \quad \diagdown N \diagup CH \\ \quad \mid \\ \quad CH_3 \end{array}$$

to the action of a substance selected from the group consisting of alkali metals and alkali metal alcoholates, and treating the product thus formed with an acid to liberate a ketotetrahydropyridine derivative of the formula $$\begin{array}{c} COOC_2H_5 \\ CH \\ CO \diagdown C.COOC_2H_5 \\ CH_3.CH \quad \| \\ \quad \diagdown N \diagup CH \\ \quad \mid \\ \quad CH_3 \end{array}$$

4. A process for the manufacture of a ketotetrahydropyridine derivative which comprises subjecting the condensation product of methyl-α-benzylaminopropionate and dimethyl-α-formyl succinate of the formula $$\begin{array}{c} CH_2COOCH_3 \\ COOCH_3 \diagdown C.COOCH_3 \\ CH_3-CH \quad \| \\ \quad \diagdown N \diagup CH \\ \quad \mid \\ \quad CH_2-\langle \bigcirc \rangle \end{array}$$

to the action of a substance selected from the group consisting of alkali metals and alkali metal alcoholates, and treating the product with an acid thus formed to liberate a ketotetrahydropyridine derivative of the formula

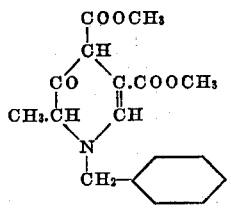

5. As new chemical compounds ketotetrahydropyridine derivatives of the general formula

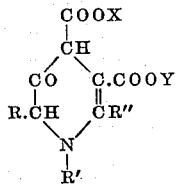

in which R is an alkyl radical, R' is a member selected from the group consisting of alkyl and aralkyl radicals, R'' is hydrogen, and X and Y are lower alkyl radicals, not necessarily identical, and salts thereof.

6. As a new chemical substance, a compound of the formula

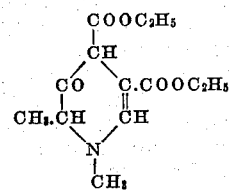

and salts thereof.

7. As a new chemical substance, a compound of the formula

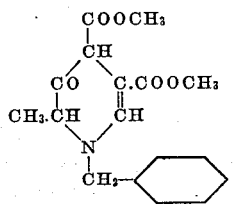

and salts thereof.

8. As new chemical substances, compounds of the general formula

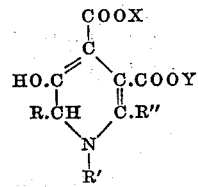

in which R is an alkyl radical, R' is a member selected from the group consisting of alkyl and aralkyl radicals, R'' is hydrogen, and X and Y are lower alkyl radicals, not necessarily identical, and salts thereof.

9. A process for the manufacture of ketotetrahydropyridine derivatives of the general formula

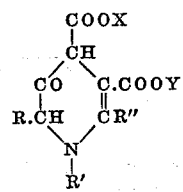

which comprises subjecting compounds of the general formula

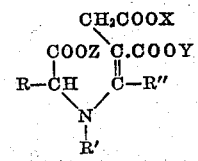

to the action of an alkali metal, and treating the product thus formed with an acid to liberate a ketotetrahydropyridine derivative of the aforesaid general formula, in both formulae R being alkyl, R' being a member selected from the group consisting of alkyl and aralkyl radicals, R'' being hydrogen, and X, Y and Z being lower alkyl radicals, not necessarily identical.

10. A process for the manufacture of ketotetrahydropyridine derivatives of the general formula

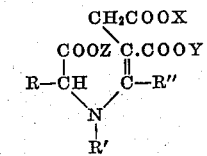

which comprises subjecting compounds of the general formula

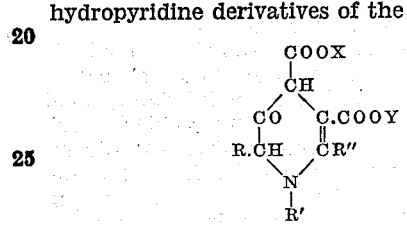

to the action of an alkali metal in the presence of an inert solvent and under an inert atmosphere, and treating the product thus formed with an acid to liberate a ketotetrahydropyridine derivative of the aforesaid general formula, in both formulae R being alkyl, R' being a member selected from the group consisting of alkyl and aralkyl radicals, R'' being hydrogen, and X, Y and Z being lower alkyl radicals, not necessarily identical.

11. A process for the manufacture of a ketotetrahydropyridine derivative which comprises subjecting the condensation product of the ethyl ester of N-methylalanine and diethyl-α-formyl succinate having the formula

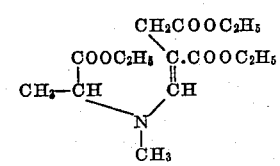

to the action of an alkali metal, and treating the product thus formed with an acid to liberate a ketotetrahydropyridine derivative of the formula

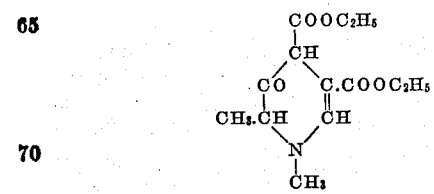

12. A process for the manufacture of a ketotetrahydropyridine derivative which comprises subjecting the condensation product of methyl-α- benzylaminopropionate and dimethyl-α-formyl succinate of the formula

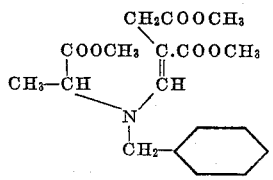

to the action of an alkali metal, and treating like product thus formed with an acid to liberate a ketotetrahydropyridine derivative of the formula

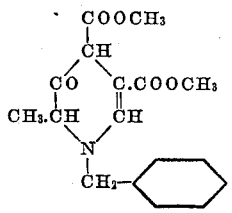

13. A process for the manufacture of ketotetrahydropyridine derivatives of the general formula

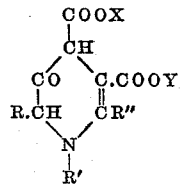

which comprises subjecting compounds of the general formula

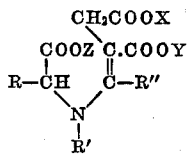

to the action of an alkali metal alcoholate, and treating the product thus formed with an acid to liberate a ketotetrahydropyridine derivative of the aforesaid general formula, in both formulae R being alkyl, R' being a member selected from the group consisting of alkyl and aralkyl radicals, R'' being hydrogen, and X, Y and Z being lower alkyl radicals, not necessarily identical.

14. A process for the manufacture of ketotetrahydropyridine derivatives of the general formula

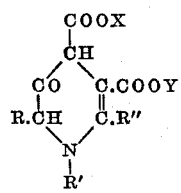

which comprises subjecting compounds of the general formula

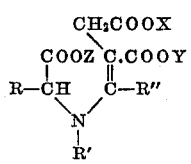

to the action of an alkali metal alcoholate in the presence of an inert solvent and under an inert atmosphere, and treating the product thus formed with an acid to liberate a ketotetrahydropyridine derivative of the aforesaid general formula, in both formulae R being alkyl, R' being a member selected from the group consisting of alkyl and aralkyl radicals, R'' being hydrogen, and X, Y and Z being lower alkyl radicals, not necessarily identical.

15. A process for the manufacture of a ketotetrahydropyridine derivative which comprises subjecting the condensation product of the ethyl ester of N-methylalanine and diethyl-α-formyl succinate having the formula

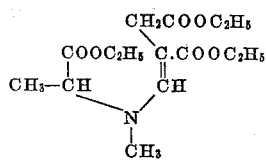

to the action of an alkali metal alcoholate, and treating the product thus formed with an acid to liberate a ketotetrahydropyridine derivative of the formula

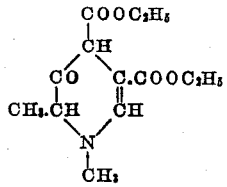

16. A process for the manufacture of a ketotetrahydropyridine derivative which comprises subjecting the condensation product of methyl-α-benzyl-aminopropionate and dimethyl-α-formyl succinate of the formula

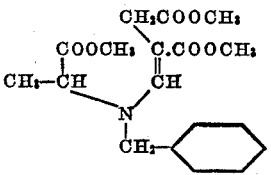

to the action of an alkali metal alcoholate, and treating the product thus formed with an acid to liberate a ketotetrahydropyridine derivative of the formula

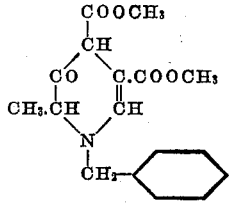

FRANZ BERGEL.
AARON COHEN.

REFERENCES CITED

The following references are of record in the file of this patent:

UNITED STATES PATENTS

| Number | Name | Date |
|---|---|---|
| 2,302,903 | Westphal | Nov. 24, 1942 |

FOREIGN PATENTS

| Number | Country | Date |
|---|---|---|
| 556,044 | Great Britain | Sept. 17, 1943 |
| 119,056 | Australia | Oct. 9, 1944 |
| 16,486 | Ireland | Dec. 29, 1943 |

OTHER REFERENCES

Berichte de Deut. Gess., vol. 72, pp. 1453–1457.
Journal American Chem. Soc., vol. 6, p. 3202.
Scientific Papers of Inst. of Phys. & Chem. Research, pp. 347–352.

Certificate of Correction

Patent No. 2,440,218.                                                April 20, 1948.

FRANZ BERGEL ET AL.

It is hereby certified that errors appear in the printed specification of the above numbered patent requiring correction as follows: Column 5, line 29, for "Ichida" read *Ichiba*; column 8, line 25, claim 10, for that portion of the formula reading "$\overset{\|}{\underset{/}{C}}R$"   read   $\overset{\|}{\underset{/}{C}}.R"$ column 9, line 10, claim 12, for "like" read *the*; and that the said Letters Patent should be read with these corrections therein that the same may conform to the record of the case in the Patent Office.

Signed and sealed this 29th day of June, A. D. 1948.

[SEAL]

THOMAS F. MURPHY,
*Assistant Commissioner of Patents.*